Figure 1:
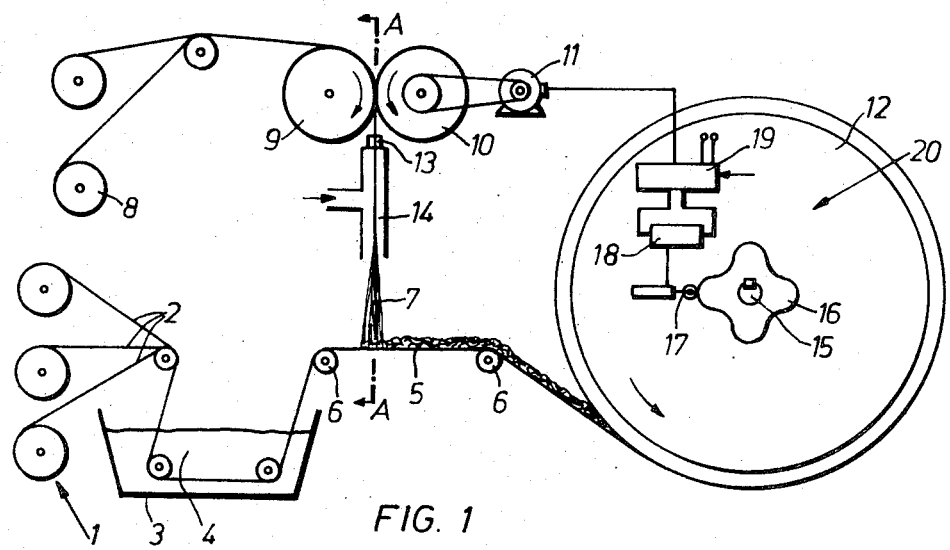

United States Patent
Goerden et al.

[11] 3,791,900
[45] Feb. 12, 1974

[54] PROCESS AND APPARATUS FOR THE PRODUCTION OF HOLLOW BODIES FROM REACTION RESINS, WHICH ARE REINFORCED WITH FIBRES

[75] Inventors: Leonard Goerden, Oedt; Franz Gromping, Krefeld, both of Germany

[73] Assignee: Bayer Aktiengesellschaft, Leverkusen, Germany

[22] Filed: Jan. 24, 1972

[21] Appl. No.: 220,055

[30] Foreign Application Priority Data
Feb. 9, 1971 Germany.......................... 2105955

[52] U.S. Cl................ 156/171, 156/172, 156/173, 156/175, 156/187, 156/192, 156/195, 156/425, 156/429, 156/440, 156/446
[51] Int. Cl............................................. B65h 81/06
[58] Field of Search... 156/171, 173, 175, 187, 192, 156/195, 425, 429, 440, 441, 446, 169, 191; 28/1 SM

[56] References Cited
UNITED STATES PATENTS

| | | | |
|---|---|---|---|
| 3,616,063 | 10/1971 | Bradley | 156/425 |
| 3,510,038 | 5/1970 | Bundy et al | 28/1 |
| 2,859,506 | 11/1958 | Slayter | 28/1 |
| 3,700,527 | 10/1972 | Grosh | 156/175 |
| 3,623,930 | 11/1971 | Grosh | 156/173 |
| 3,341,394 | 9/1967 | Kinney | 264/24 |

Primary Examiner—Daniel J. Fritsch
Attorney, Agent, or Firm—Ralph D. Dinklage

[57] ABSTRACT

Glass fibre reinforced hollow bodies, e.g. pipes produced from reaction resins, are produced by a winding process whereby the fibres are fed to a supporting layer as endless rovings with a speed which is higher than the circumferential speed of the winding core whereby the supporting layer supplies the rovings to the winding core at a speed equal to the circumferential speed of the latter.

24 Claims, 5 Drawing Figures

PATENTED FEB 12 1974  3,791,900

PROCESS AND APPARATUS FOR THE PRODUCTION OF HOLLOW BODIES FROM REACTION RESINS, WHICH ARE REINFORCED WITH FIBRES

The present invention relates to a process and an apparatus for the production of hollow bodies, such as pipes or containers, from reaction resins, for example, from unsaturated polyester resins or epoxide resins, the bodies being reinforced with fibres, for example, glass fibres, metal fibres, natural or synthetic fibres, the fibres being impregnated with the resin and being wound on to a rotating winding core. In such cases, use is made of an arrangement comprising a winding device having a rotatable winding core and an impregnating apparatus.

Especially for the production of pipes and containers from synthetic plastics reinforced with glass fibres, the winding process is the one most commonly used, having been found advantageous for this purpose. A large number of machines is already on the market for the manufacture of such pipes and containers, and these operate almost exclusively in accordance with the so-called lathe system. In this system, a winding core is rotated between two bearings. The support generally consists of a warp beam, and an impregnating tank is provided in which the rovings are wetted with the resin/hardener mixture. By stripping and wringing arrangements the excess resin is removed and the roving band is brought by way of a guiding comb on the winding mandrel, the support being reciprocated. Depending on the construction of the pipe or container to be manufactured, and the purpose for which it is intended to be used, a certain number of layers of fibre rovings are wound helically on to the winding core, which is usually cylindrical or conical. The windings or convolutions are disposed in juxtaposition. With a reciprocatory travel of the support, two helical windings of opposite pitch are obtained, which intersect one another at an angle. The larger this angle of intersection, the greater is the percentage of reinforcement in the longitudinal direction. Nevertheless, the choice of angle is not unlimited, because it is restricted by the band width and the diameter of the winding body. With large diameters, practically no longitudinal reinforcement is produced in this way. It is true that this produces a high circumferential strength, but the axial strength is generally even considerably below the pure resin strength. Therefore, additional measures must be adopted to provide the required degree of axial strengthening. This is achieved by the additional use of unidirectional fabrics or roving bands, which are applied either manually or mechanically by auxiliary arrangements.

This method of procedure has been adopted for the manufacture of containers and pipes and is designated as the "parallel winding method." Containers or pipes as thus manufactured are usually provided internally with a fine coating or a liner, in order to protect them against the action of the material with which it is subsequently to be filled.

One possibility for obtaining large intersection angles and thus an axial strengthening, even with average diameters, consists in applying multi-pitch windings. However, this requires a complicated control means, so that after each passage of the support, the winding core is further rotated through an accurately defined amount, in order to obtain the connection to the preceding winding. With cylindrical hollow bodies, the maximum possible increase in the intersection angle is obtained when the roving no longer finds any sufficient support at the turning point and slips off.

These processes are generally intermittent. However, continuously operating winding installations are also known. With these installations, a continuously extruded pipe of thermoplastic materials is completely covered with rovings in the longitudinal direction. These longitudinal rovings are fixed by peripheral windings which are in close juxtaposition. The roving spools and impregnating baths are mounted for universal rotation around the pipe which is slowly moved forward axially. The installation is therefore of very complicated construction.

In another known process, a continuous steel band is positively wound on to a mandrel. The surface of the core consists of a plurality of rolls, on which the wound steel band slides in the peripheral direction and, because of the positive winding, also slides in the axial direction. In this way, there is obtained a rotating surface which moves forward slowly in the axial direction and which advances the wound laminate continuously in the axial direction. The laminate travels through a hardening furnace and can be cut off to the required size. The building up of the laminates is effected simultaneously in a certain sequence. First of all, a separating foil may for example be wound on, this being followed by a resin layer, a fleece, a mat layer, a winding layer, a further mat layer, an axial-reinforcing layer, a further winding layer, etc. Finally, a further fleece is also wound on. In order to avoid the need for a separate winding station for each layer, the separate windings are arranged to overlap.

It is true that the problem of the continuous winding is satisfactorily solved with this process, but other problems which arise during the winding operation are not. In particular axial strengthening presents difficulties here. Each use of containers and pipes consisting of fibre-reinforced synthetic plastics require special properties in the wall. Apart from the construction, a container which is subjected to swelling and bending requires larger wall thickness. For example, in calculating the strength of a storage tank, the wall thickness increases quadratically under bending loads, but with swelling loads it often increases by a power as high as three. Thick walls can be produced more economically by having a higher resin content of the laminate. A part of the safety which can be produced with greater wall thicknesses is of course lost again because of the low glass content, since the mechanical properties, for example, the premissible tensile and bending stress, in the region of interest, decreases approximately linearly with decreasing glass content. The mechanical strength values, however, only enter with the first power into the calculations. Consequently, with all building components which are subjected to bending or swelling stresses, as for example silos, storage tanks arranged above and below ground, culverts and the like, it would be more appropriate to select a large wall thickness with high resin content than a thin wall with high fibre content, because it is possible more easily and more cheaply to achieve a greater rigidity by an increase in the moment of resistance and thus of the wall thickness than by increasing the E-modulus. Theoretically and from experience, it is known that normally with wound bodies it is true that thicker walls would be appropriate, but it is not absolutely necessary to increase the wall thickness on the entire circumference and over the entire length. Scarcely any wound bodies exist which are wound uniformly in the annular and axial directions. Usually, there are always places exposed to particular danger and it would be expedient to give particular protection to these places by strengthening the wall.

It is the object of the invention to provide a process and an apparatus for the production of hollow bodies from fibre-reinforced reaction resins, using the winding method, in which a good axial strengthening is achieved, a high resin content can be adjusted and it is possible to vary the nature of the walls of the hollow body in the circumferential direction.

According to the present invention, there is provided a process for the production of hollow bodies from a reaction resin strengthened with fibres, the fibres being impregnated with the resin and being wound on to a rotating winding core, wherein the fibres which are in the form of continuous rovings are delivered to a supporting layer at a speed which is higher than the circumferential speed of the winding core, the supporting layer supplying them to the winding core at a speed equal to the circumferential speed of the latter.

The result thereby achieved is that the rovings are deposited in the form of loops or coils on the supporting layer. The latter guides them as a loose, bulky mat impregnated with resin to the winding core, so that the fibres, on being laid on the said core, are directed more in the axial direction as regards their position as compared with the prior known process.

It is advantageous to use rovings as the supporting layer for the circumferential winding. That is to say, the rovings supplied in accordance with the hitherto usual circumferential winding method serve simultaneously as the supporting layer. It is obvious that the supporting layer could be formed instead of a travelling continuous band. However, it is difficult to keep this band free from the resin. Thus, preferably a foil which can be thoroughly impregnated with the resin or a paper band can be used as supporting layer, which is then also wound on to the winding core.

According to a further development of the process according to the invention, the continuous rovings are moved backwards and forwards transversely of the supporting layer before being delivered thereto. As a consequence, they are deposited in a meandering pattern, it being possible for the separate loops to be laid almost parallel to the axial direction of the winding core. By choice of the speed of supply of the continuous rovings or by choice of the width and the frequency of the reciprocatory movement, the expert can readily provide a more or less dense packing of fibre material to the winding core.

According to another advantageous development of the process according to the invention, the rovings are fanned out before being deposited on the supporting layer. This is advantageously effected by an air stream or alternatively by electrostatic charging. The fanning operation causes a randomly tangled deposition, so that a layer is formed which is as homogeneous as possible in the circumferential and axial direction. Using the aforesaid measures, the body produced can have the particular strength properties desired in each case.

The same purpose is also served by another further development of the process according to the invention, namely, by the supply speed of the endless rovings to the supporting layer being varied in the circumferential direction of the winding core. In the same manner, the speed of supply of the continuous rovings to the supporting layer can optionally and additionally to the aforesaid operating step be varied longitudinally of the winding core.

By all these measures, it is possible in a simple manner as compared with the prior art, to produce an axial reinforcement and also a resin content of more than 60 percent by weight. More especially, by varying the supply speed in the circumferential direction and longitudinal direction, hollow bodies can be produced which contain as desired a greater or lesser amount of fibre material in their wall at places which are under particularly heavy stress. Hence an optimum design is possible for the relevent type of loading.

The apparatus for carrying out the process is characterised in that the supporting arrangement is preceded by an unwinding station for a supporting layer and in that a conveyor device for continuous rovings is arranged above the path of the said layer. The supporting layer preferably consists of fibre rovings. Since these fibre rovings serve at the same time as a circumferential winding, the danger of soiling is considerably reduced. Two conveyor rolls or cylinders preferably serve as the conveyor device, the continuous rovings being withdrawn from an unwinding station between the said cylinders. The circumferential speed of the conveying cylinders is preferably adjustable and higher than the circumferential speed of the rotating winding mandrel. The conveyor cylinders are preferably so arranged that the rovings being conveyed fall from the said cylinders on to the supporting layer and in this way form loops or coils.

According to one particular development of the apparatus according to the invention, the conveyor device is followed by a traversing mechanism or the conveyor device is itself additionally designed as a traversing mechanism.

It is advantageous for the conveyor device or the traversing mechanism to be followed by a fanning arrangement. This causes a tangled deposition of the rovings on the supporting layer in a highly homogeneous form. The fanning arrangement may consist for example of an air jet nozzle or of an ionisation arrangement. In the first case, the air stream provides for a tangling of the individual filaments of the rovings and in the second case the separate filaments are charged electrostatically and mutually repel one another.

According to another particular embodiment, the winding arrangement has arranged thereon switch contacts which correspond with a control means acting on the drive means of the conveying arrangement. A shaped disc arranged on the shaft is for example suitable to provide the switch contacts, the disc operating on a plunger which drives the direct current motor of the conveyor arrangement through a potentiometer and amplifier. Such discs are replaceable, so that pipes having walls of different consistency can be produced without lengthy periods being needed for preparatory work. A shaped rod can be used instead of a disc for altering the fibre content in the longitudinal direction. If necessary, the disc and rod can be used simultaneously.

Figure 2:
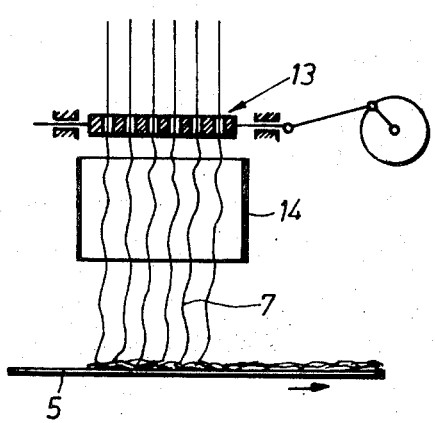
Figure 3:
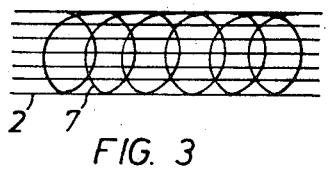
Figure 4:
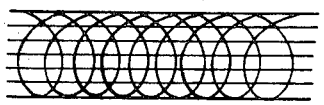
Figure 5:
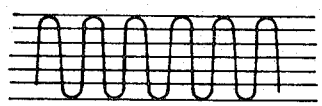

Referring to the accompanying drawings:

FIG. 1 shows an arrangement according to the invention in a diagrammatic side elevation, FIG. 2 is a section on the line A—A of FIG. 1, while FIGS. 3 to 5 show in plan view different forms of the deposition of the continuous fibre rovings on the supporting layer.

In FIGS. 1 and 2, glass fibre rovings 2 are guided from a supply station 1 through an impregnating tank 3 in which they are impregnated with an unsaturated polyester resin 4. On a horizontal travel section 5 between two guide cylinders 6, continuous rovings 7 are deposited on the rovings 2, which serve as a supporting layer. The rovings 7 are withdrawn from a reel station 8 by conveyor cylinders 9 and 10, which are rotated by a drive means 11 at a higher speed than that of the winding core 12. The rovings 7 pass through a traversing mechanism 13 (FIG. 2). Thereafter, they reach a fanning arrangement 14, which here consists of an air nozzle. The latter can also be replaced by an ionisation arrangement for electrostatically charging the filaments. The support rovings 2 now travel together with those rovings 7 which are deposited on them in the form of a mat to a winding mandrel 12 at a speed corresponding to the circumferential speed of the latter. The rovings are wound on to the mandrel 12, the support rovings 2 pressing the rovings 7 deposited in mat form on to the winding core 12. Arranged on the winding shaft 15 is a shaped disc 16, which co-operates with a plunger 17, the latter adjusting a potentiometer 18, on the output side of which is connected an amplifier 19. This amplifier delivers impulses to the driving motor 11 of the conveyor cylinders 9, 10. The components 16, 17, 18 and 19 of this installation together form a control arrangement 20.

In FIG. 3, the rovings 7 form circular loops on the support rovings 2 as they are deposited. This is achieved by suitably matching the supply speed of the rovings 7 in relation to the circumferential speed of the winding core 12. A fanning operation was not effected in this case.

In FIG. 4, the loops of the rovings 7 are compressed somewhat, this being achieved by another matching of the supply speed of the rovings to the circumferential speed of the winding core 12. As in the previous case there was no tangling of the separate filaments.

Finally, FIG. 5 shows the typical meandering pattern of the rovings 7 produced by the reciprocatory movement produced in the rovings 7, as they are deposited by means of the traversing mechanism 13.

A few examples are given below in order to demonstrate the new process. Various pipes with a diameter of 700 mm were made. In all cases, an unsaturated polyester resin, type 1120, according to DIN 16946, was used. The resin was cold-cured with 1 % diethyl aniline (10 %) and 3 % of benzoyl peroxide paste (50 %). 60 glass fibre rovings were used.

EXAMPLE 1

As a basis for comparison, a pipe was manufactured by the known winding method. 24 rovings were laid on in the circumferential direction. A glass content of 60.5 % by weight was obtained. The strength in the circumferential direction of the pipe was 4700 Kp/cm$^2$, whereas it was only 50 Kp/cm$^2$ axially.

EXAMPLE 2

Using the same rovings and the same resin, pipes were manufactured by the process according to the invention. As compared with the previous 24 rovings, only 14 rovings were used in this case to form the supporting layer. 3 rovings were supplied at a speed which was 13 times the circumferential speed of the winding core. The weight of the tangled mat laid on the rovings was therefore 2.8 times that of the rovings forming the supporting layer. By depositing the rovings by free fall on the supporting rovings, there was obtained a pipe having a glass content of 45 percent by weight, a circumferential strenght of 2500 kp/cm$^2$ and an axial strength of 810 kp/cm$^2$.

EXAMPLE 3

A pipe was produced as in Example 2, except that the supplied rovings were guided through an air stream and as a consequence given a bulky form. A glass content of 35 percent by weight was obtained. The strength values of the pipe were 1980 kp/cm$^2$ in the circumferential direction and 550 kp/cm$^2$ in the axial direction.

The results can be summarized as follows:

| Method of manufacture | Glass weight of the support rovings/ glass weight of the supplied rovings | Glass content | Strength in the circumferential direction kp/cm$^2$ | Strength in the axial direction kp/cm$^2$ |
| --- | --- | --- | --- | --- |
| only circumferential direction | 1/0 | 60.5 | 4700 | 50 |
| without air | 1/2.8 | 45 | 2500 | 810 |
| with air | 1/2.8 | 35 | 1980 | 550 |

EXAMPLE 4

A pipe was manufactured for use as a vertical silo. For this purpose, the wall thickness was increased uniformly, depending on the length. During the entire manufacturing process, the support travelled with a constant speed of advance. The circumferential speed of the winding core was 13.5 m/min. 14 rovings served as a support layer and 4 rovings were supplied thereto. The speed at which the supplied rovings was conveyed was increased linearly from 20 m/min to 140 m/min by changing the speed of the conveyor cylinders during the winding operation. In this way, the wall thickness could be increased from 3.1 mm to 9.8 mm with 8 layers of windings.

What we claim is:

1. In a process for the production of hollow bodies composed of resin strengthened with continuous fibers wherein the fibers are wound onto a mandrel serving as a mould for the production of the hollow body, the fibers are impregnated with unhardened resin, and after the winding and impregnation, the resin is hardened, the improvement which comprises delivering the continuous fibers to a supporting layer for supporting said continuous fibers and winding the supporting layer carrying the continuous fibers onto the mandrel, the speed of delivery of the fibers onto the supporting layer being greater than the circumferential winding speed whereby increased axial disposition of the fibers in the hollow body is achieved for axial strengthening of the hollow body.

2. A process according to claim 1, wherein the resin is an unsaturated polyester.

3. A process according to claim 1, wherein the resin is an epoxide resin.

4. A process according to claim 1, wherein said continuous fibres are glass fibres, metal fibres, natural fibres, or synthetic fibres.

5. A process according to claim 1, wherein the supporting layer is formed of rovings.

6. A process according to claim 1, wherein said continuous fibres are moved transversely backwards and forwards relative to the supporting layer while being delivered thereto.

7. A process according to claim 1, wherein said continuous fibers are fanned out relative to the supporting layer before being deposited on the supporting layer.

8. A process according to claim 7, wherein the fanning is effected by an air stream.

9. A process according to claim 7, wherein the fanning operation is effected by electrostatic charging.

10. A process according to claim 1, wherein said speed of supply of the continuous fibers to the supporting layer is varied in the circumferential direction of the mandrel.

11. A process according to claim 1, wherein the speed of supply of said continuous fibers to the supporting layer is varied longitudinally of the mandrel.

12. A process according to claim 1, wherein the mandrel is rotated for winding the continuous fibers thereon, and said continuous fibers are continuous rovings.

13. A process according to claim 1, wherein said continuous fibers are continuous rovings.

14. Apparatus for the production of hollow bodies composed of resin strengthened with continuous fibers, with the resin impregnating the continuous fibers, comprising:
a. a rotatably mounted mandrel for receiving and winding thereon of continuous fibers and impregnating resin,
b. means for supplying a supporting layer for said continuous fibers and delivering the continuous fibers on the supporting layer to the mandrel for said winding on the mandrel,
c. conveyor means for delivery of said continuous fibers to the supporting layer at a delivery speed greater than the circumferential winding speed of the mandrel,
d. means for supplying impregnating resin to the continuous fibers.

15. An apparatus according to claim 14, the conveyor means (c) comprising cooperating rolls for drawing said continuous fibers from a source therefor, and a transversing mechanism positioned to receive the fibers from the rolls and for controlling the path of said continuous fibers onto the support layer and moving said continuous fibers transversely relative to the path of the supporting layer.

16. An apparatus according to claim 14, the conveying means (c) comprising means for fanning the continuous fibers relative to the path of the supporting layer.

17. An apparatus according to claim 15, the conveying means (c) comprising means for fanning the continuous fibers coming from the transversing mechanism, relative to the path of the supporting layer.

18. Apparatus according to claim 16, the fanning means comprising an air jet.

19. Apparatus according to claim 17, the fanning means comprising an air jet.

20. Apparatus according to claim 16, the fanning means comprising an electrostatic charging device.

21. Apparatus according to claim 17, the fanning means comprising an electrostatic charging device.

22. An apparatus according to claim 14, the conveyor means comprising cooperating rolls for drawing the continuous fibers from a source therefor, drive means for the cooperating rolls, and means for controlling the speed of the cooperating rolls in dependence on the operation of the mandrel.

23. An apparatus according to claim 14, wherein the conveyor device is constructed as a traversing mechanism.

24. Apparatus according to claim 14, the conveying means being disposed above the support supplying means for fall of said continuous fibers onto the supporting layer.

* * * * *